(12) United States Patent
Pikovsky et al.

(10) Patent No.: US 10,174,634 B2
(45) Date of Patent: Jan. 8, 2019

(54) DEVICE AND METHOD FOR LUBRICATING A TURBOMACHINE ROLLING BEARING

(71) Applicant: SAFRAN AIRCRAFT ENGINES, Paris (FR)

(72) Inventors: Catherine Pikovsky, Moissy-Cramayel (FR); Tewfik Boudebiza, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/320,702

(22) PCT Filed: Jun. 15, 2015

(86) PCT No.: PCT/FR2015/051583
§ 371 (c)(1),
(2) Date: Dec. 20, 2016

(87) PCT Pub. No.: WO2015/197943
PCT Pub. Date: Dec. 30, 2015

(65) Prior Publication Data
US 2017/0145857 A1    May 25, 2017

(30) Foreign Application Priority Data

Jun. 23, 2014    (FR) .................................... 14 55803

(51) Int. Cl.
*F01D 25/18*    (2006.01)
*F16C 33/66*    (2006.01)
(Continued)

(52) U.S. Cl.
CPC ............ *F01D 25/18* (2013.01); *F01D 25/16* (2013.01); *F01M 11/02* (2013.01); *F16C 19/26* (2013.01);
(Continued)

(58) Field of Classification Search
CPC .. F16C 33/6677; F16C 2360/23; F16C 19/26; F01D 25/18; F01D 25/20; F01D 25/16;
(Continued)

(56) References Cited

U.S. PATENT DOCUMENTS 1,913,769 A  *  6/1933  Moreland ............. F16C 19/386
277/500
1,927,534 A  *  9/1933  Wooler ................ F16C 19/386
29/898.1

(Continued)

FOREIGN PATENT DOCUMENTS

EP        1 507 328 A2    2/2005
FR        2 688 574 A1    9/1993
JP        2004251308 A  *  9/2004   ............. F16C 19/28

OTHER PUBLICATIONS

International Preliminary Report on Patentability dated Dec. 27, 2016, issued in corresponding International Application No. PCT/FR2015/051583, filed Jun. 15, 2015, 1 page (Continued)

*Primary Examiner* — Alan B Waits
(74) *Attorney, Agent, or Firm* — Christensen O'Connor Johnson Kindness PLLC

(57) ABSTRACT

A device for lubricating a turbomachine rolling bearing includes a rolling bearing mounted between an internal component and an external component. The bearing has rolling elements mounted between an outer ring secured to the external component and an inner ring secured to the internal component. The internal component includes at least one first duct for the passage of oil for supplying the internal ring of the bearing with oil, wherein the internal component is a stator component and at least one first duct is connected to an oil supply source configured to deliver the (Continued)

oil at a pressure high enough that this oil can be conveyed as far as the rolling elements of the bearing.

12 Claims, 5 Drawing Sheets

(51) Int. Cl.
*F16C 19/26* (2006.01)
*F01D 25/16* (2006.01)
*F01M 11/02* (2006.01)

(52) U.S. Cl.
CPC .... *F16C 33/6677* (2013.01); *F05D 2220/323* (2013.01); *F05D 2240/54* (2013.01); *F05D 2260/98* (2013.01); *F16C 2360/23* (2013.01)

(58) Field of Classification Search
CPC ........... F05D 2220/323; F05D 2240/54; F05D 2260/98
See application file for complete search history.

(56) References Cited

U.S. PATENT DOCUMENTS

| | | | |
|---|---|---|---|
| 3,243,243 A | 3/1966 | Diver et al. | |
| 3,497,277 A | 2/1970 | Malott | |
| 4,384,749 A | 5/1983 | Schaefer | |
| 5,562,348 A * | 10/1996 | Link | B60G 11/12 267/267 |
| 7,036,989 B2 * | 5/2006 | Taki | F16C 19/386 384/462 |
| 8,425,361 B1 * | 4/2013 | Beckner | F16H 57/0479 475/159 |
| 2003/0185477 A1 * | 10/2003 | Taki | F16C 19/386 384/475 |
| 2005/0133466 A1 | 6/2005 | Bridges | |
| 2011/0026865 A1 * | 2/2011 | Haas | F16C 19/386 384/462 |
| 2015/0147178 A1 * | 5/2015 | Frantz | B64C 11/306 416/164 |
| 2015/0176645 A1 * | 6/2015 | Doki-Thonon | F16C 33/6677 384/392 |

OTHER PUBLICATIONS

Written Opinion of the International Searching Authority dated Sep. 7, 2015, issued in corresponding International Application No. PCT/FR2015/051583, filed Jun. 15, 2015, 6 pages.

International Search Report dated Sep. 7, 2015, issued in corresponding International Application No. PCT/FR2015/051583, filed Jun. 15, 2015, 7 pages.

Written Opinion of the International Searching Authority dated Sep. 7, 2015, issued in corresponding International Application No. PCT/FR2015/051583, filed Jun. 15, 2015, 5 pages.

* cited by examiner

DEVICE AND METHOD FOR LUBRICATING A TURBOMACHINE ROLLING BEARING

TECHNICAL FIELD

The present invention relates in particular to a device and a method for lubricating a rolling bearing of a turbine engine.

PRIOR ART

Conventionally, a turbine engine rolling bearing is mounted between an internal part and an external part, the bearing comprising rolling elements that are mounted between an external race that is rigidly connected to the external part, and an internal race that is rigidly connected to the internal part.

A turbine engine bearing is generally lubricated by means of a nozzle that sprays oil onto the bearing or in the region of the bearing.

In the prior art, in the case where the bearing is mounted between two rotor parts (the external race is rigidly connected to the external rotor part, and the internal race is rigidly connected to the internal rotor part) or between a rotor part and a stator part (the external race is rigidly connected to the external stator part, and the internal race is rigidly connected to the internal rotor part), the bearing is lubricated, during operation, by the oil which is transported by the internal race as far as the bearing by means of centrifugal forces. In this case, the internal rotor part comprises oil flow ducts for supplying oil to the internal race of the bearing, the radially internal ends of which ducts open into a trough for retaining oil supplied by a nozzle. On account of the centrifugal forces, the oil flows from the trough to the bearing, passing through the ducts of the internal part.

However, this technology is not suitable in the case where the internal support part of the internal race of the bearing is a stator part, i.e. a part that is immobile during operation. Since the stator part is not subjected to centrifugal forces, there is currently no solution for effectively lubricating the bearing without oil being applied directly onto the bearing by means of a nozzle.

The present invention proposes a simple, effective and economical solution to this problem.

DISCLOSURE OF THE INVENTION

The invention proposes a device for lubricating a rolling bearing of a turbine engine, comprising a rolling bearing that is mounted between an internal part and an external part, the bearing comprising rolling elements that are mounted between an external race that is rigidly connected to the external part, and an internal race that is rigidly connected to the internal part, the internal part comprising at least one first oil flow duct for supplying oil to the internal race of the bearing, characterised in that the internal part is a stator part, and in that said at least one first duct is connected to an oil supply source that is designed to deliver oil at a sufficient pressure for said oil to be transported as far as the rolling elements of the bearing.

The present invention thus proposes a solution to the above-mentioned problem in which the technology of the prior art is adapted so as to make it possible to lubricate a bearing that is mounted between an internal stator part and an external rotor part. This adaptation consists in connecting the ducts of the stator part to an oil supply source that is designed to deliver oil at a sufficient pressure for said oil to be transported as far as the bearing. In contrast with the prior art in which the oil is transported as far as the bearing by means of centrifugal forces, in this case the oil is transported as far as the bearing by means of the pressure at which the source supplies the oil, which oil is not subjected to any centrifugal force.

The internal race preferably comprises substantially radial oil flow channels, the radially internal ends of which channels open into an annular cavity, such as an internal annular cavity of the internal race.

According to a particular embodiment of the invention, an intermediate part, such as a sleeve, is interposed between the internal part and the internal race, said intermediate part comprising at least one second oil flow duct that is connected to said at least one first duct.

The radially internal end of said at least one second duct can open into an annular cavity into which the radially external end of said at least one first duct opens. The cavity is an external annular cavity of the intermediate part, for example.

Said at least one first duct can have a diameter that is different from that of said at least one second duct.

Advantageously, said at least one first duct is in fluid communication with a recess for receiving an end of a pipe for supplying oil from said source. At least one seal can be mounted between the end of the pipe and the recess.

Said at least one first duct preferably defines an oil flow cross section that is smaller than or equal to that of the pipe. In a variant or as additional features, said at least one second duct defines an oil flow cross section that is smaller than or equal to that of the pipe. The flow cross sections of the first and/or second ducts are thus advantageously designed such that said ducts have a calibration function.

The present invention also relates to a turbine engine, such as a turboprop engine having at least one unducted propeller, characterised in that it comprises at least one device as described above.

The present invention further relates to a method for lubricating a rolling bearing of a turbine engine, said bearing being mounted between an internal part and an external part, the bearing comprising an external race that is rigidly connected to the external part, and an internal race that is rigidly connected to the internal part, the internal part comprising at least one first oil flow duct for supplying oil to the internal race of the bearing, characterised in that, as the internal part is immobile, said method consists in supplying oil to said at least one first duct at a sufficient pressure for said oil to be transported as far as the bearing.

DESCRIPTION OF THE DRAWINGS

The invention will be better understood, and other details, features and advantages of the invention will become apparent upon reading the following description, given by way of non-limiting example with reference to the accompanying drawings, in which.

DETAILED DESCRIPTION

Figure 1:
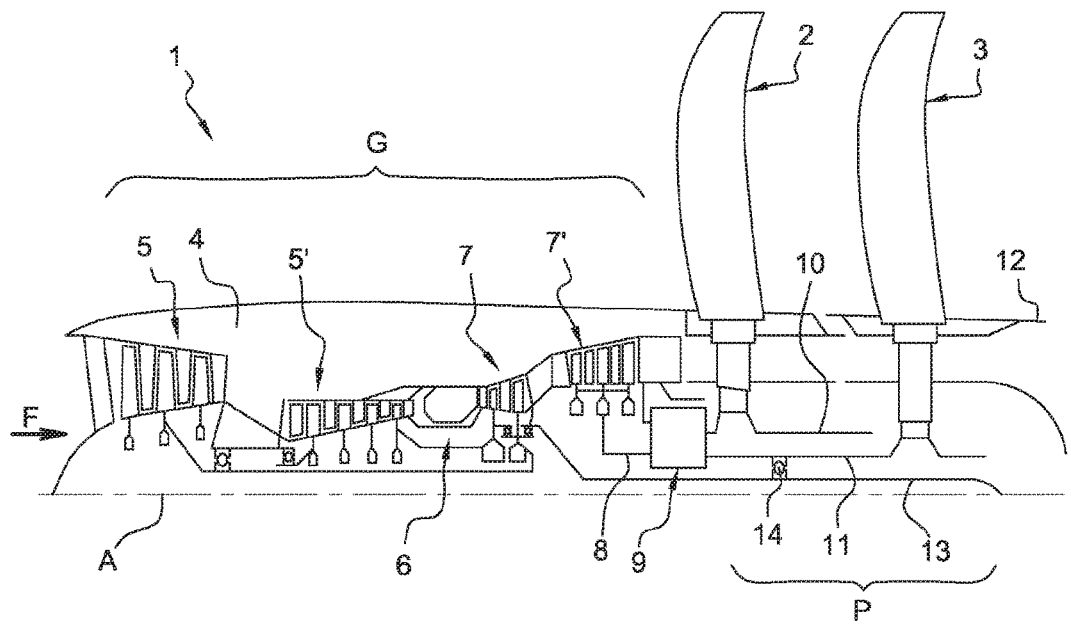
FIG. 1 is a very schematic, axial sectional half view of a turboprop engine having a pair of unducted propellers.

Reference is first made to FIG. 1 which shows a turboprop engine 1 for an aircraft, said turboprop engine being provided with a pair of contra-rotating propellers and referred to as "open rotor" or "unducted fan".

The turboprop engine 1 comprises an upstream propeller 2 and a downstream propeller 3 that are mounted so as to rotate in opposing directions about the longitudinal axis A. The turboprop engine 1 comprises a "gas generator" portion G that is located inside a stationary cylindrical nacelle 4 that is supported by the structure of the aircraft (such as the rear portion of the fuselage of an aeroplane), and a "propulsion" portion P comprising the pair of propellers 2, 3 arranged in parallel radial planes that are perpendicular to the axis A and forming an unducted fan (open rotor). In this example of a turboprop engine, this portion P extends the gas generator portion G and the nacelle 4.

The gas generator portion G of the turboprop engine 1 usually comprises, from upstream to downstream in the flow direction, with respect to the axis A, of the gaseous flow F entering the nacelle 4, one or more compressors 5, 5' according to the architecture of the gas generator having one or more bodies, an annular combustion chamber 6, one or more turbines 7, 7' having a distinct pressure according to said architecture, the shaft 8 of one of said turbines driving, by means of a device for reducing speed or a reducer 9 having epicyclic gears (PBG, or power gear box) and in a contra-rotating manner, the concentric and coaxial shafts 10 and 11 of the two propellers, upstream 2 and downstream 3, that are aligned along the axis A of the turboprop engine. An exhaust nozzle 12 terminates the turboprop engine 1 in the usual manner.

During operation, the airflow F entering the turboprop engine 1 is compressed and then mixed with fuel and burnt in the combustion chamber 6. The combustion gases generated then pass into the turbines 7, 7' in order to set the propellers 2, 3, which supply the major part of the thrust, into reverse rotation, via the epicyclic reducer 9. The combustion gases are expelled through the exhaust nozzle 12, thus increasing the thrust of the turboprop engine 1.

As can be seen in FIG. 1, the radially internal shaft 11 surrounds a cylindrical stator sleeve 13 and is centred and rotatably guided about said sleeve by means of at least one rolling bearing 14 that has to be lubricated in order to ensure the proper operation thereof.

As described above, the prior art cannot be used for lubricating this bearing 14 since the sleeve 13 is immobile during operation and the oil in contact with said sleeve 13 is not subjected to any centrifugal force.

Figure 2:
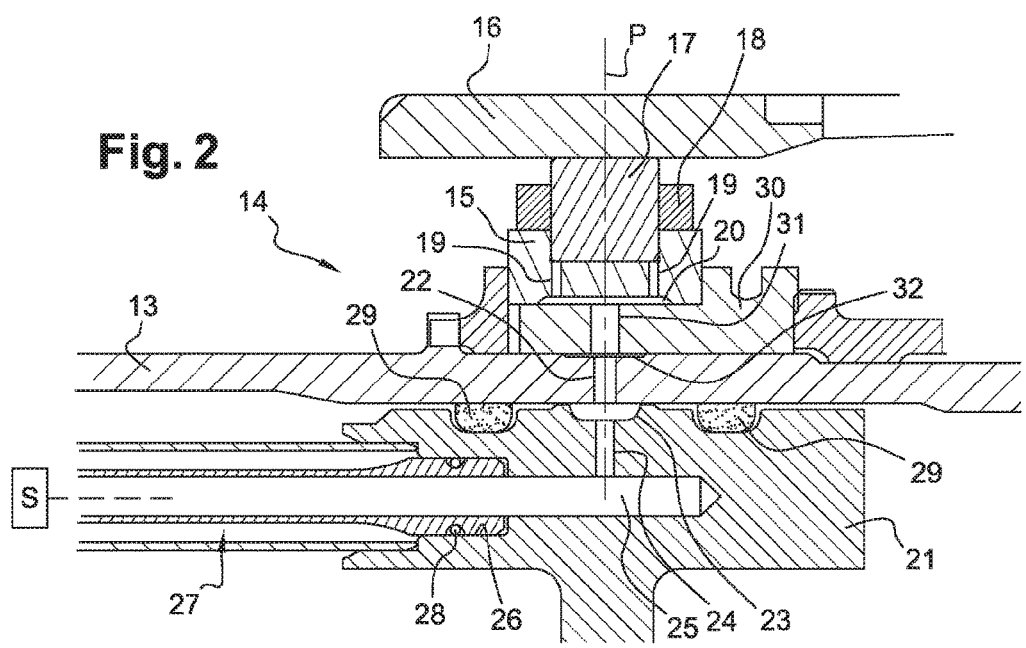
FIG. 2 is a schematic, axial sectional half view of a lubricating device according to the invention.

FIG. 2 shows an embodiment of a device according to the invention for lubricating a rolling bearing. In this drawing, the reference signs 13 and 14 denote the sleeve and the bearing, respectively, as is the case in FIG. 1.

The bearing 14 conventionally comprises two races, internal 15 and external 16, respectively, between which rolling elements 17 such as balls or rollers are mounted, which elements are, in this case, kept at a distance from one another by means of an annular cage 18.

The internal race 15 comprises two annular rows, upstream and downstream, respectively, of oil flow channels 19. Said channels 19 are substantially radial, the radially external ends thereof opening onto the rolling track of the race 15 and the radially internal ends thereof opening into an internal annular cavity 20 of the race 15.

In the example shown, the internal race 15 of the bearing 14 is mounted on a race support 30 which is itself mounted on the sleeve 13 inside which an internal part 21 is mounted. The internal race 15, the race support 30, the part 21 and the sleeve 13 are coaxial and are rigidly interconnected. They are thus all immobile during operation, in contrast with the external race 16 of the bearing 14 which is fixed to the rotor shaft 11 of FIG. 1 for conjoint rotation.

The race support 30 comprises an annular row of oil flow ducts 31. Said ducts 31 are substantially radial. The radially external ends thereof open into the cavity 20 of the race 15, and the radially internal ends thereof open into an external annular cavity 32 of the sleeve 13.

The sleeve 13 comprises an annular row of oil flow ducts 22. Said ducts 22 are substantially radial. The radially external ends thereof open into the cavity 32, and the radially internal ends thereof open into an external annular cavity 23 of the internal part 21.

The part 21 comprises at least one oil flow duct 24. Said duct 24 is substantially radial. The radially external end thereof opens into the cavity 23, and the radially internal end thereof opens into an internal recess 25 of the part 21.

In this case, the ducts 31, 22 and 24 extend in the same transverse plane P that passes substantially between the channels 19, halfway between said channels.

The recess 25 in the part 21 comprises a widened upstream portion 26 in which an end of a pipe 27 is fitted, the other end of which pipe is connected, directly or indirectly, to an oil source S. In this case, the end of the pipe 27 carries an O-ring seal 28 that engages with an internal wall of the recess 25 in order to ensure a sealed connection between the pipe 27 and the part 21. In this case, the pipe 27 has a substantially axial orientation. Said pipe thus extends substantially in parallel with the above-mentioned axis A.

Two annular seals 29 are mounted between the sleeve 13 and the part 21, upstream and downstream, respectively, of the cavity 23, in order to ensure sealed fluid connection between the ducts 22, 24.

The source S mainly comprises a pump and an oil reservoir (not shown). The source S is intended for supplying the device with oil at a sufficient pressure for the oil to be transported, purely on account of said pressure, from the reservoir as far as the bearing 14 (and in particular as far as the rolling elements 17), passing successively through the recess 25, the duct 24, the cavity 23, the ducts 22, the cavity 20 and the channels 19 (cf. arrows).

Figure 3:
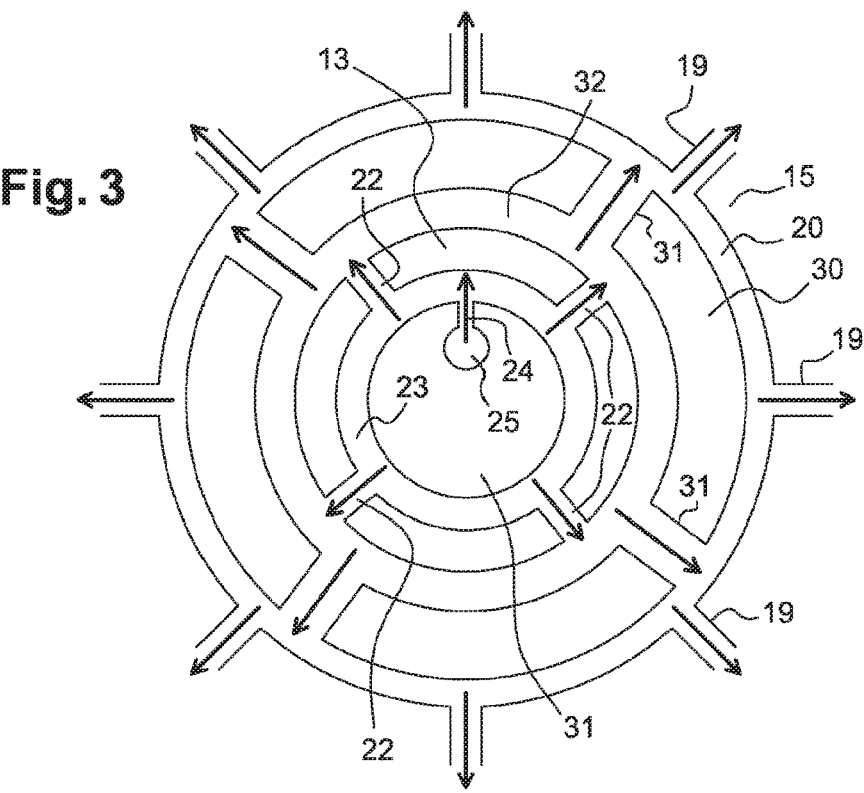
FIGS. 3 and 4 are very schematic views of members of the device of FIG. 2, and show variants of the invention in a section perpendicular to the axis of the engine, all the oil flows being brought into the same plane in order to improve understanding.

In the example shown, and as is also shown schematically in FIG. 3, the flow cross section defined by the duct 24 is smaller than that of the ducts 22 (i.e. smaller than the cumulative flow cross sections of said ducts 22), and smaller than that of the ducts 31, 19, of the pipe 27 and of the recess 25. The flow cross section of the duct 24 is a calibrating flow cross section that is intended for calibrating the pressure of the oil supplying the bearing 14. As the flow cross sections of the ducts 22 and of the ducts 31, 19 are larger than that of the duct 24, the oil pressure will barely change while flowing in the ducts 22 and will therefore be substantially the same in the cavities 20 and 23. Moreover, the cavities 23 and 20 are designed so as to change this pressure as little as possible.

Figure 4:
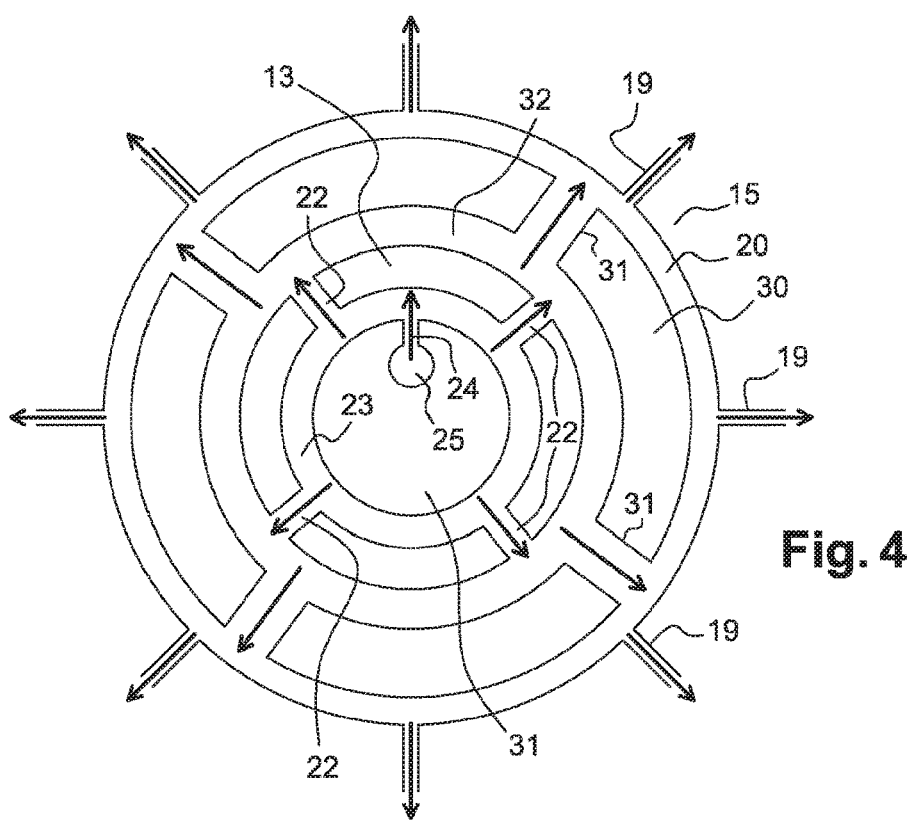
Figure 5:
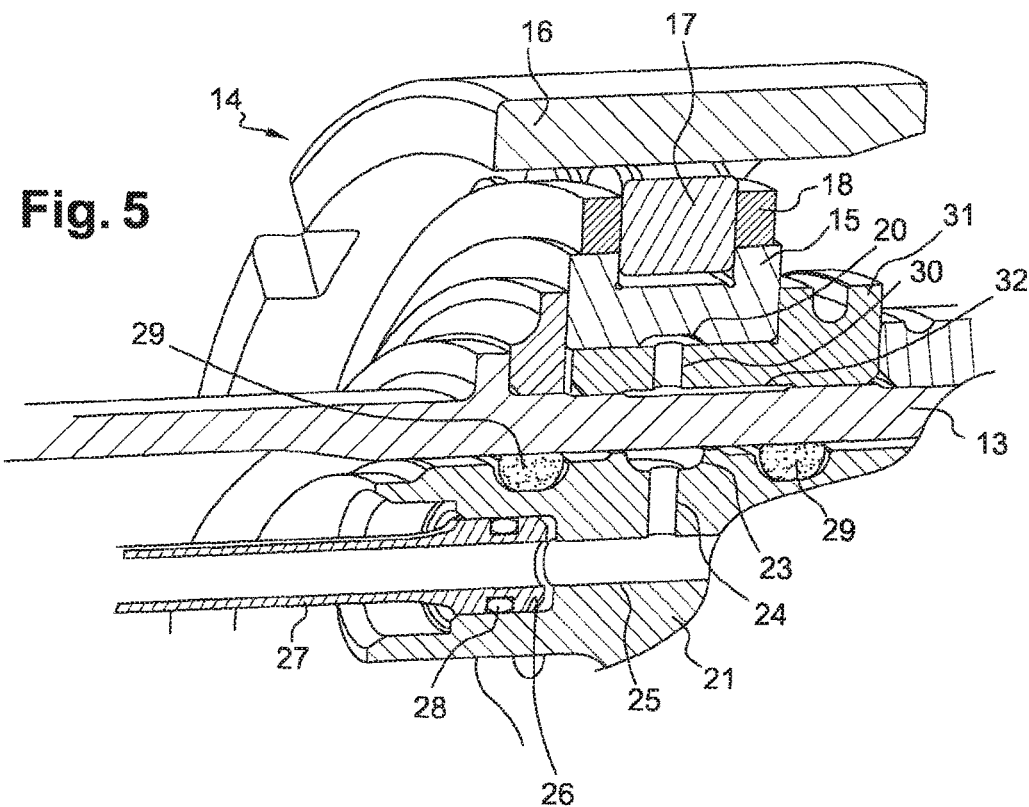
FIGS. 5 and 6 are schematic partial perspective views in axial section of the device of FIG. 2.
Figure 6:
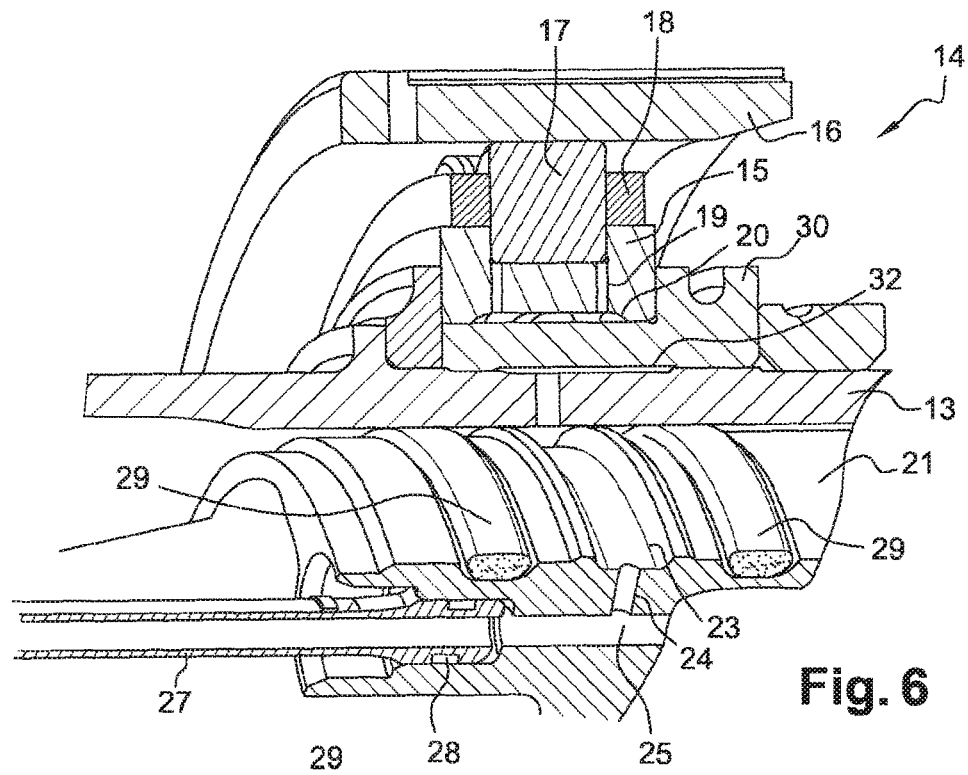

FIG. 4 shows a variant in which it is the ducts 19 that provide the oil pressure calibration function. The flow cross section defined by the ducts 19 (cumulative flow cross sections of said ducts 19) is smaller than that of the duct 24 and smaller than that of the ducts 31, 22 (cumulative flow cross sections of said ducts 31, 22), of the pipe 27 and of the recess 25. The flow cross section of the ducts 19 is a calibrating flow cross section that is intended for calibrating the pressure of the oil supplying the bearing 14. The pressure of the oil will therefore be changed while flowing in the ducts 19 and will be higher in the cavity 20 than in the cavity 23.

Figure 7:
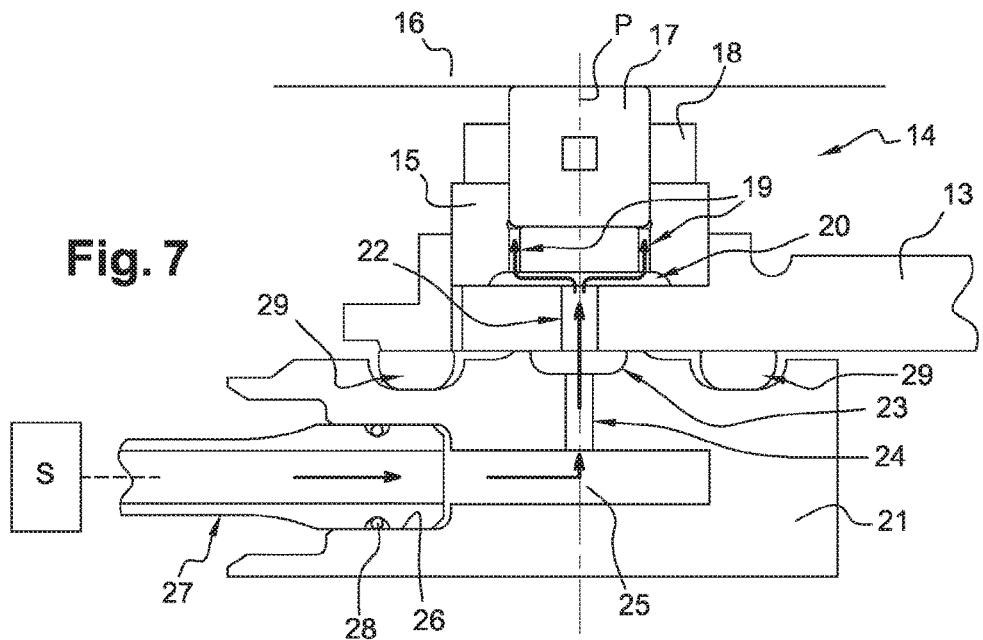
FIG. 7 is a view which corresponds to FIG. 2 and shows a variant of the invention.

Other configurations may result from adding or eliminating parts between the internal part 21 and the internal race 15. Indeed, if the race support 30 were not present, it would be possible to eliminate the ducts 31 and the cavity 32, as is shown schematically in FIGS. 7 to 9. Likewise, it would be possible to add parts that are similar to the race support 30 and that comprise ducts similar to the ducts 31 and a cavity similar to the cavity 32, i.e. having the non-calibrating cross section of the various elements for the system.

Figure 8:
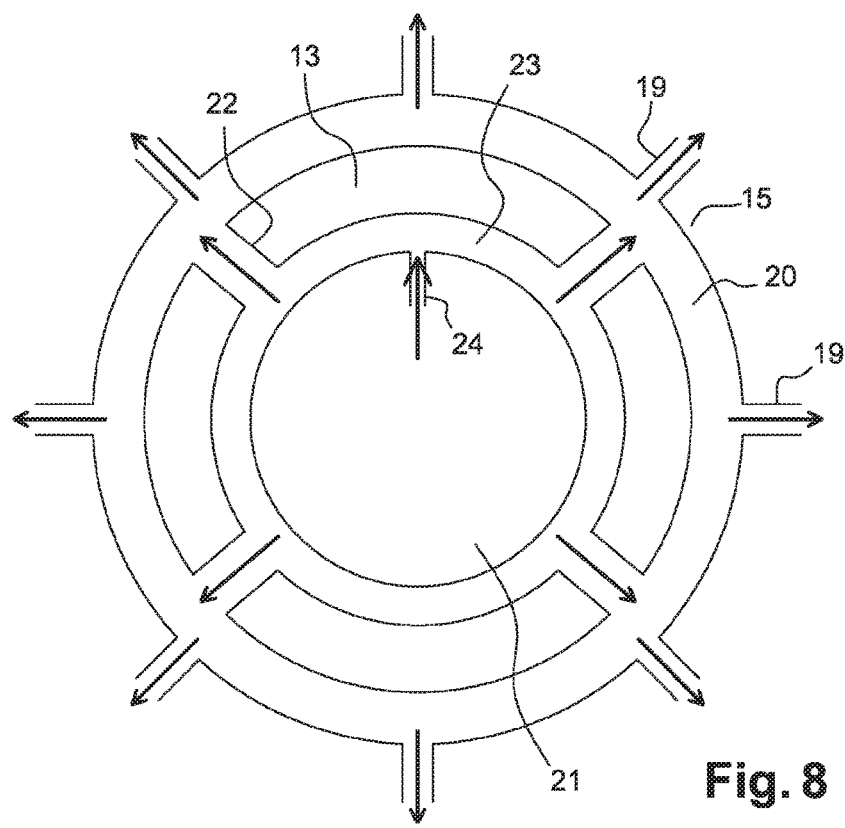
FIGS. 8 to 10 are views which correspond to FIGS. 3 and 4 and show further variants of the invention.
Figure 9:
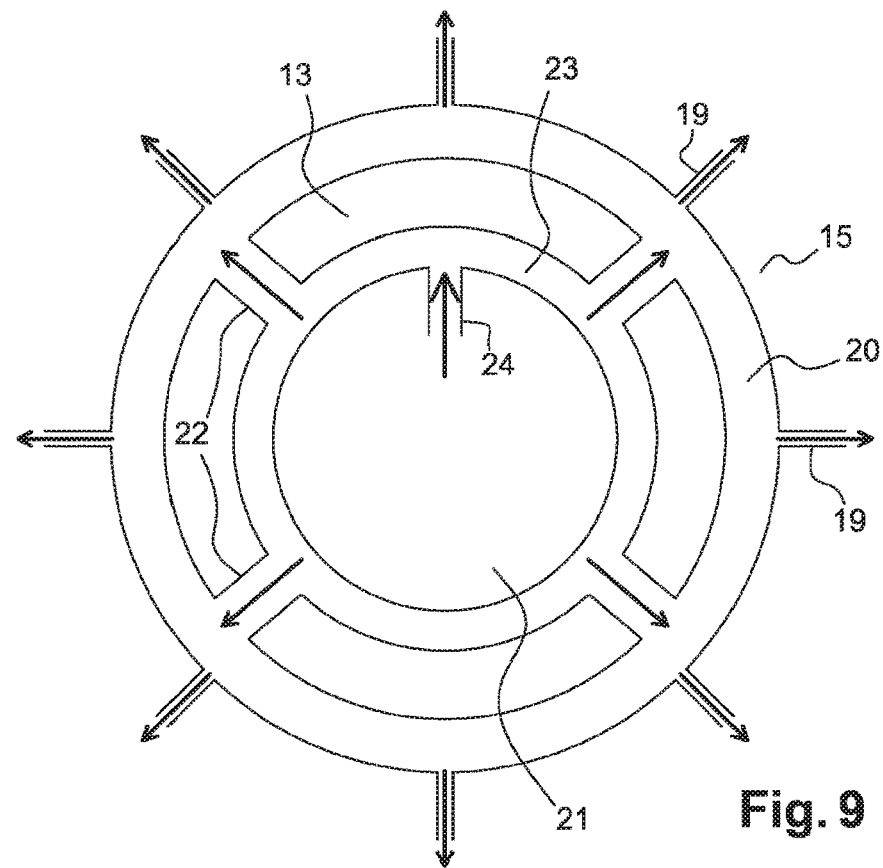
Figure 10:
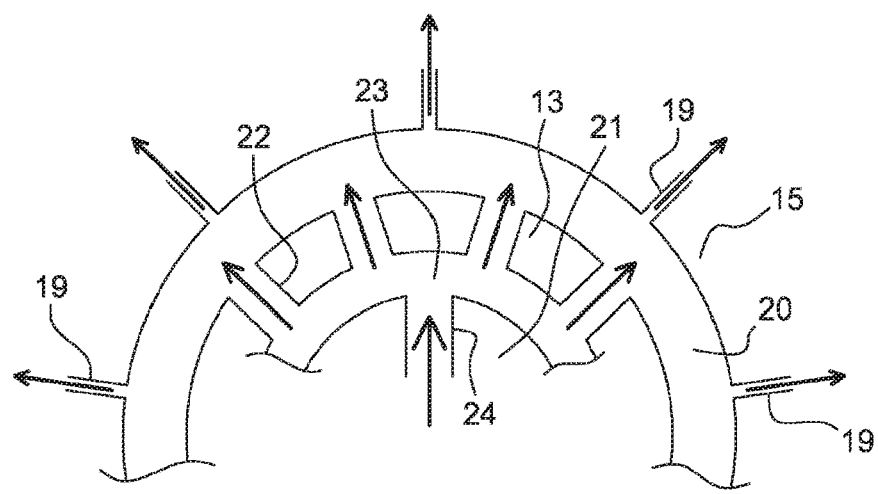

FIG. 10 shows an improvement of the embodiments shown in FIGS. 8 and 9. The parts 13, 21 and 15 may have an angular locating pin in order for the ducts 24, 22 and 19 to be positioned in the top portion of the engine. Advantageously, the duct 24 is positioned at 12:00 (or 12 o'clock, by analogy with a watch face). The ducts 22 must cover an angular perimeter that is greater than that of the duct 24 and is centred on 12:00. The ducts 19 must cover an angular perimeter that is greater than that of the ducts 22, is centred on 12:00 and is preferably smaller than or equal to [−90°; +90°].

The invention claimed is:

1. A device for lubricating a rolling bearing of a turbine engine, comprising a rolling bearing that is mounted between an internal part and an external part, the bearing comprising rolling elements that are mounted between an external race that is rigidly connected to the external part, and an internal race that is rigidly connected to the internal part, the internal part comprising at least one first oil flow duct for supplying oil to the internal race of the bearing, wherein the internal part is a stator part, and said at least one first duct is connected to an oil supply source that is designed to deliver oil at a sufficient pressure for said oil to be transported as far as the rolling elements of the bearing, wherein the internal race comprises an upstream annular row of oil flow channels and a downstream annular row of oil flow channels, the oil flow channels being substantially radial, radially external ends of the oil flow channels opening onto a rolling track of the internal race and radially internal ends of the oil flow channels opening into an internal annular cavity of the internal race, said at least one first duct extending in a transverse plane that passes substantially halfway between the upstream annular row of oil flow channels and the downstream annular row of oil flow channels.

2. The device according to claim 1, wherein an intermediate part is interposed between the internal part and the internal race, said intermediate part comprising at least one second oil flow duct that is connected to said at least one first duct.

3. The device according to claim 2, wherein the radially internal end of said at least one second duct opens into an annular cavity into which the radially external end of said at least one first duct opens.

4. The device according to claim 2, wherein said at least one first duct has a diameter that is different from that of said at least one second duct.

5. The device according to claim 2, wherein said at least one first duct is in fluid communication with a recess for receiving an end of a pipe for supplying oil from said source.

6. The device according to claim 5, wherein said at least one first duct defines an oil flow cross section that is smaller than or equal to that of the pipe, and/or said at least one second duct defines an oil flow cross section that is smaller than or equal to that of the pipe.

7. A turbine engine having at least one unducted propeller, comprising the device according to claim 1.

8. The turbine engine according to claim 7, wherein the turbine engine is a turboprop engine.

9. The device according to claim 1, wherein said device is configured to lubricate a single rolling bearing.

10. A method for lubricating a rolling bearing of a turbine engine, said bearing being mounted between an internal part and an external part, the bearing comprising an external race that is rigidly connected to the external part, and an internal race that is rigidly connected to the internal part, the internal part comprising said at least one first oil flow duct for supplying oil to the internal race of the bearing, wherein, as the internal part is a stator part, wherein the internal race comprises an upstream annular row of oil flow channels and a downstream annular row of oil flow channels, the oil flow channels being substantially radial, radially external ends of the oil flow channels opening onto a rolling track of the internal race and radially internal ends of the oil flow channels opening into an internal annular cavity of the internal race, said at least one first duct extending in a transverse plane that passes substantially halfway between the upstream annular row of oil flow channels and the downstream annular row of oil flow channels, said method comprises the step of supplying oil to said at least one first duct at a sufficient pressure for said oil to be transported as far as the bearing.

11. A device for lubricating a rolling bearing of a turbine engine, comprising a rolling bearing that is mounted between an internal part and an external part, the bearing comprising rolling elements that are mounted between an external race that is rigidly connected to the external part, and an internal race that is rigidly connected to the internal part, the internal part comprising at least one first oil flow duct for supplying oil to the internal race of the bearing, wherein the internal part is a stator part, and said at least one first duct is connected to an oil supply source that is designed to deliver oil at a sufficient pressure for said oil to be transported as far as the rolling elements of the bearing, wherein the internal race is mounted on a race support which is itself mounted on a sleeve, the race support comprising an annular row of oil flow ducts, said oil flow ducts being substantially radial, the radially external ends of the oil flow ducts opening into an internal annular cavity of the internal race, and the radially internal ends of the oil flow ducts opening into an external annular cavity of the sleeve.

12. A device for lubricating a rolling bearing of a turbine engine, comprising a rolling bearing that is mounted between an internal part and an external part, the bearing comprising rolling elements that are mounted between an external race that is rigidly connected to the external part, and an internal race that is rigidly connected to the internal part, the internal part comprising at least one first oil flow duct for supplying oil to the internal race of the bearing, wherein the internal part is a stator part, and said at least one first duct is connected to an oil supply source that is designed to deliver oil at a sufficient pressure for said oil to be transported as far as the rolling elements of the bearing, wherein the internal race is mounted on a race support which is itself mounted on a sleeve inside which the internal part is mounted, said at least one first duct being in fluid communication with a recess for receiving an end of a pipe for supplying oil from said source, the internal race comprising substantially radial oil flow channels, the race support comprising an annular row of oil flow ducts, the sleeve comprising an annular row of oil flow ducts, the oil flow channels of the internal ring defining an oil flow cross section that is smaller than following oil flow cross sections:

the oil flow cross section defined by said at least one first duct of the internal part;

the oil flow cross section defined by the oil flow ducts of the race support;

the oil flow cross section defined by the oil flow ducts of the sleeve;

the oil flow cross section defined by the pipe; and the oil flow cross section defined by the recess.

* * * * *